(12) United States Patent  (10) Patent No.: US 7,697,043 B2
Kobayashi  (45) Date of Patent: Apr. 13, 2010

(54) APPARATUS FOR COMPENSATING FOR COLOR SHADING ON A PICTURE PICKED UP BY A SOLID-STATE IMAGE SENSOR OVER A BROAD DYNAMIC RANGE

(75) Inventor: Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1467 days.

(21) Appl. No.: 11/050,696

(22) Filed: Feb. 7, 2005

(65) Prior Publication Data

US 2005/0219404 A1 Oct. 6, 2005

(30) Foreign Application Priority Data

Mar. 19, 2004 (JP) .............................. 2004-080190

(51) Int. Cl.
*H04N 9/64* (2006.01)
*H04N 5/228* (2006.01)
*H04N 5/235* (2006.01)
*H04N 9/68* (2006.01)
*H04N 5/217* (2006.01)

(52) U.S. Cl. .................. 348/251; 348/222.1; 348/229.1; 348/234; 348/241

(58) Field of Classification Search .............. 348/222.1, 348/223.1, 224.1, 227.1, 228.1, 229.1, 234, 348/235, 236, 237, 238, 241, 248, 249, 250, 348/251, 254, 255, 266, 272, 273, 274, 275, 348/277, 281, 282, 289, 290, 284, 297, 298, 348/300, 301, 311, 315, 362, 363, 364, 366

See application file for complete search history.

(56) References Cited

U.S. PATENT DOCUMENTS

| 5,119,181 | A  | * | 6/1992 | Perregaux et al. | ............ 348/275 |
| 6,750,437 | B2 | * | 6/2004 | Yamashita et al. | ........ 250/208.1 |
| 7,292,280 | B2 | * | 11/2007 | Yamazaki et al. | ............ 348/363 |
| 7,349,024 | B2 | * | 3/2008 | Oda et al. | .................... 348/370 |
| 2002/0008760 | A1 | * | 1/2002 | Nakamura | .................. 348/222 |
| 2003/0141564 | A1 |   | 7/2003 | Kondo et al. | |

FOREIGN PATENT DOCUMENTS

JP    8-79773 A    3/1996

* cited by examiner

*Primary Examiner*—Nhan T Tran
*Assistant Examiner*—Peter Chon
(74) *Attorney, Agent, or Firm*—Birch, Stewart, Kolasch & Birch, LLP

(57) ABSTRACT

In a solid-state image pickup apparatus, a preliminary pickup circuit performs, during preliminary pickup, divided photometry on a photometry signal outputted from the primary cells of photo-sensors, determines an exposure condition in which photometry data in all divided blocks do not exceed the saturation maximum value of the primary cells, and calculates the individual photometry data tints under the above exposure condition. During actual pickup, a shading corrector included in an image processing circuit divides subsidiary image data in the same manner as during the divided photometry, calculates shading correction gains in accordance with the photometry data tints and those of the subsidiary image data, and interpolates the shading correction gains in accordance with the pixel for thereby executing color shading correction on the subsidiary image data.

48 Claims, 11 Drawing Sheets

APPARATUS FOR COMPENSATING FOR COLOR SHADING ON A PICTURE PICKED UP BY A SOLID-STATE IMAGE SENSOR OVER A BROAD DYNAMIC RANGE

BACKGROUND OF THE INVENTION

1. Field of the Invention

The present invention relates to a solid-state image pickup apparatus for compensating for color shading on a picture picked up by a solid-state image sensor having photo-sensors arranged, each of which has a set of photosensitive cells different in sensitivity from each other, to produce image information over a broad dynamic range, and a method of compensating for color shading for the same.

2. Description of the Background Art

It is a common practice with a solid-state image pickup apparatus capable of picking up a picture over a broad dynamic range by a solid-state image sensor, which has photo-sensors arranged, each having a primary and a secondary photosensitive cell different in sensitivity from each other. The primary cell, higher in sensitivity to incident light than the secondary cell, forms an image with a well modulation. The secondary cell accurately captures image, or contrast, information even on an imaged region that would cause a white blur in a usual exposure condition or would cause the primary cell to produce a saturated signal. U.S. patent publication No. US 2003/0141564 A1 of Kondo et al, for example, proposes a solid-state image pickup device capable of picking up a picture over a broad dynamic range by processing signals outputted from the main and subsidiary photosensitive fields.

Generally, in a solid-state image pickup device, image signals outputted from a solid-state image sensor may involve shading due to, e.g. unevenness in quantity of light incident to the respective photo-sensors. For example, in the case of a digital camera including a solid-state image sensor which has microlenses formed, the quantity of incident light to the respective photo-sensors noticeably varies in dependence upon the direction of the incidence particular to the microlenses. More specifically, to a photosensitive cell located in the vicinity of the edge of the imaging frame of the image sensor, light is incident often inclined, so that the incident light is poorer in quantity than one incident to a photosensitive cell located near the center of the frame. Consequently, the luminance of the signals produced in the vicinity of the edge of the frame is poorer, thus resulting in shading.

Japanese patent laid-open publication No. 79773/1996 discloses a shading correcting device for correcting shading by multiplying image signals outputted from an image sensor by a shading correction coefficient, which is calculated by approximating by a quadric curved surface function. The shading correcting device with this configuration can accomplish a shading correction feasible for mass-production of image sensors and therefore free the image sensors from irregularity.

Further, U.S. patent publication No. US 2002/0008760 A1 of Nakamura teaches a digital camera for correcting shading on the basis a pixel-by-pixel correction value. The digital camera divides an imaging area into a preselected number of blocks and stores light amount correction data particularly assigned to the blocks beforehand. When correcting shading, the digital camera calculates the correction value of each pixel by weighting the light amount correction data in accordance with the positions of target pixels to thereby generate correction values for respective pixels.

The prior art documents described above have the following problems left unsolved. In Kondo et al, the solid-state image pickup device picks up an image over a broad dynamic range by processing signals outputted from the main and subsidiary photosensitive fields each constituting a particular pixel. However, the problem with Kondo et al is that all subsidiary fields in an imaging frame are arranged at one side with respect to the main photosensitive field without regard to the pixel position in the imaging frame, thus involving shading on a picture picked up which depends upon, e.g. the exit pupil position of a lens or an iris value of the camera.

The shading correcting device disclosed in Japanese publication No. 79773/1996 needs to pick up, during adjustment, a subject radiated with uniformly light, and, on the basis of the result from adjustment, the shading correction gain is determined. Then, in the adjustment procedure, correction data have to be obtained in accordance with, e.g. a zoom lens position or an iris value, and therefore, a long period of time is necessary for calculation. Although the shading correction of such a shading correcting device may be desirable for manufacturing solid-state image sensors, it is not feasible for adjusting or calibrating digital cameras.

Nakamura has a problem that because a memory in the digital camera stores correction data in one-to-one correspondence to various zoom lens positions and various iris values, the memory is required to have its storage capacity increased. Should the number of zoom lens positional sections and that of iris value sections be reduced in order to reduce the data amount required to be stored in the memory, the digital camera would involve image pickup conditions in which a complete correction is unable.

Apart from the problems stated above, secondary image data outputted from the secondary cell are used to reproduce high-luminance information and therefore often remain contained even in a completed picture in the form of high-luminance information. On a picture containing such high-luminance information, luminance shading, common to R (red), G (green) and B (blue) pixels, is not conspicuous. RGB or coloristic shading is dependent upon the wavelength of the colors R, G and B. Consequently, the coloristic shading is different in the degree of deviation between colors so as to be deviate much more toward the longer wavelength. This causes a picture to be viewed worse and critically degraded in image quality.

SUMMARY OF THE INVENTION

It is an object of the present invention to provide a solid-state image pickup apparatus capable of compensating for shading on an image picked up by a primary cell and a secondary cell positioned at each pixel over a broad dynamic range to thereby obviate critical degradation of image quality while reducing a period of time necessary for an adjustment step and the amount of data stored in a memory, and a method of compensating for shading for the same.

A solid-state image pickup apparatus of the present invention includes a solid-state image sensor including first photosensitive cells for photoelectrically converting incident light and second photosensitive cells for photoelectrically converting the incident light with lower sensitivity than the first photosensitive cells. The first photosensitive cells each form a particular pixel together with corresponding one of the second photosensitive cells. A signal processor processes a first and a second image signal outputted from the first and second photosensitive cells, respectively. The signal processor includes an actual pickup circuit for processing an actual pickup signal representative of a subject field actually picked up, and a photometry circuit for processing a photometry signal representative of the quantity of light incident from the field to perform photometry before actual pickup. The actual pickup circuit includes a shading corrector for executing shading correction on the actual pickup signal. The photometry circuit divides an image represented by the photometry signal into a preselected number of blocks, measures the quantity of incident light block by block to thereby produce the result of photometry block by block, and generates first color shading correction information in accordance with the result of photometry. The shading corrector includes a color shading corrector for generating shading correction gains in accordance with the first color shading correction information and executing, based on the shading correction gains, color shading correction on the actual pickup information.

A method of correcting shading for the above image pickup apparatus is also disclosed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
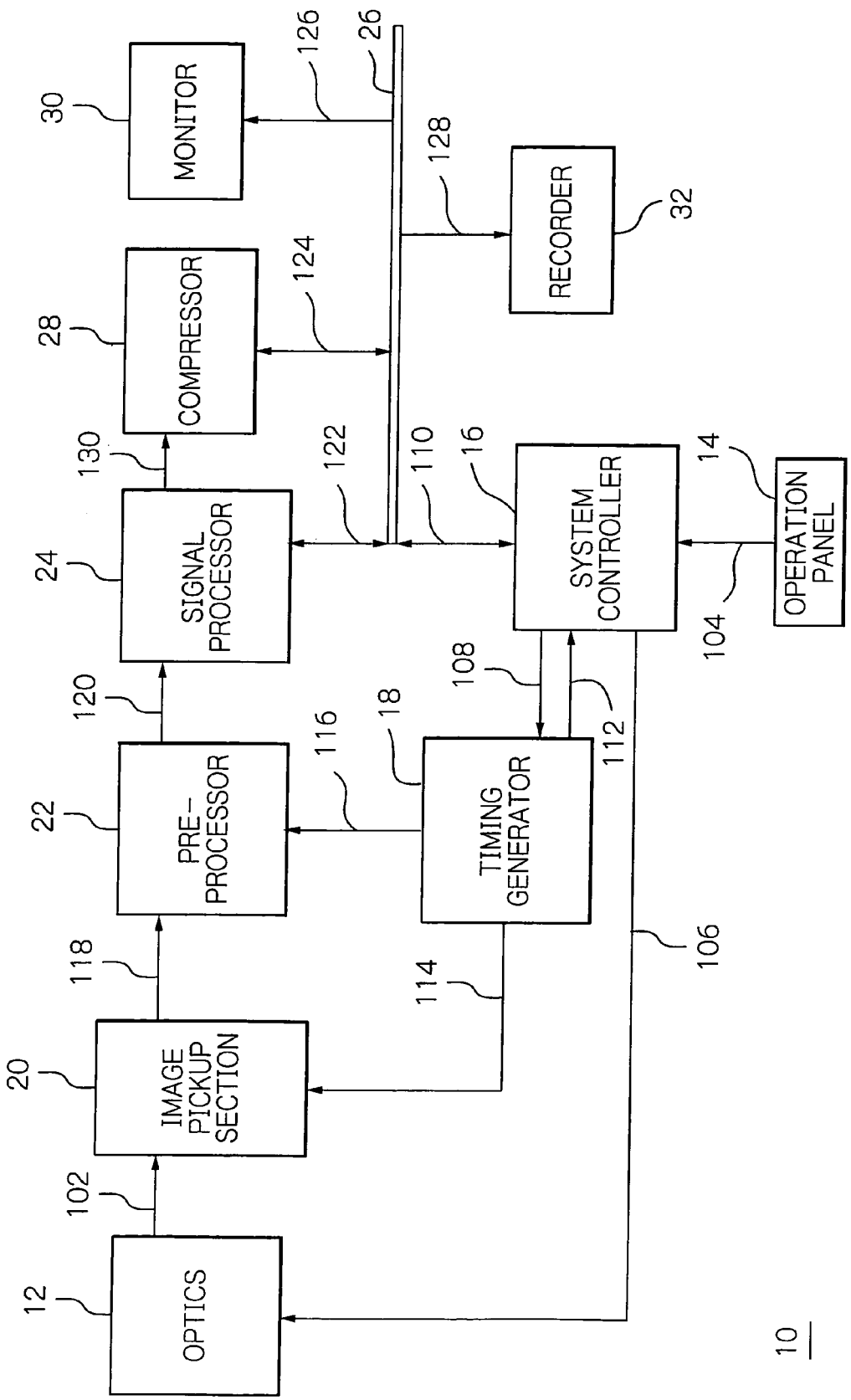
FIG. 1 is a schematic block diagram showing a preferred embodiment of the solid-state image pickup apparatus in accordance with the present invention.

Referring to FIG. 1 of the drawings, a solid-state image pickup apparatus embodying the present invention is generally designated by the reference numeral 10. As shown, the image pickup apparatus 10 includes optics 12 to which light is incident from a subject field being picked up. When the operator of the image pickup apparatus 10 operates a control panel 14, a system controller 16 and a timing generator 18 control other various-sections so that an image pickup section 20 picks up a subject field. Image data representing an image thus captured is outputted from the image pickup section 20 and sequentially processed by a preprocessor 22 and a signal processor 22 to be then inputted to a compressor 28 connected to a bus 26 as an image signal. The image signal is compressed by the compressor 28 to be delivered to a monitor 30 and a recorder 32. It is to be noted that parts and elements not directly relevant to the understanding of the present invention are not shown, and a detailed description thereof will not be made in order to avoid redundancy.

The optics 12 includes a lens, a diaphragm control mechanism, a shutter mechanism, a zoom mechanism and an AF (Automatic Focus) control mechanism, although not shown specifically. The lens is positioned substantially at the front of a barrel, not shown, and may be configured as a combination of lenses. The diaphragm control mechanism varies the radius of an optical aperture to control the quantity of light to be incident to the image pickup section 20. The shutter mechanism includes a mechanical shutter configured to close the above aperture to cut off the incident light on its optical path. Further, the zoom mechanism zooms in or out by moving the lens or lenses while the AF control mechanism focuses the image pickup apparatus 10 on a desired subject in accordance with the distance therebetween.

In the optics 12, the diaphragm control mechanism, shutter mechanism, zoom mechanism and AF control mechanism are driven in response to control signals, generally 106, to pick up the image of a desired field and focus it on a photosensitive array of the image pickup section 20. In this sense, the optics 12 plays the role of a light incidence mechanism. Considering the fact that an optical range capable of being measured by photometry at a time is limited, the diaphragm control mechanism and an electronic shutter, for example, may be adapted to be repeatedly driven to output several segments of photometric data, if desired. It is to be noted that signals are hereinafter designated by reference numerals attached to connections on which they appear.

The control panel 14 includes, e.g. a shutter release button, not shown, that can be operated by the user at the time of a shot. The control panel 14 sends out a signal 104 representative of, e.g. the operation of the shutter release button to a system controller 16.

In the illustrative embodiment, the shutter release button is adapted to be depressed into its two consecutive strokes. More specifically, when the shutter release button, held in its initial or non-depressed position, is depressed into its first stroke, or half-stroke position, the control panel 14 sends out a stroke signal 104 indicative of preliminary pickup step for detecting pickup conditions suitable for a desired subject field to the system controller 16. When the shutter release button is further depressed into its second stroke, or a full-stroke position, the stroke signal 104, sent out from the control panel 14 to the system controller 16, indicates an actual pickup step for shooting and recording the scene in accordance with the pickup conditions detected in the preliminary pickup step. In the illustrative embodiment, in the preliminary pickup step, an image of the field is picked up to be inputted to the image pickup section 20 so as to obtain information necessary for AF control and AE (Automatic Exposure) control form the image.

The system controller 16 controls the entire or general operation of the image pickup apparatus 10 in response to the stoke signal 104 outputted from the control panel 12. For example, in the illustrative embodiment, the system controller 16 delivers the control signal 106, a control signal 108 and a control signal 110 to the optics 12, a timing generator 18 and the bus 26, respectively, in response to the stroke signal 104.

Figure 2:
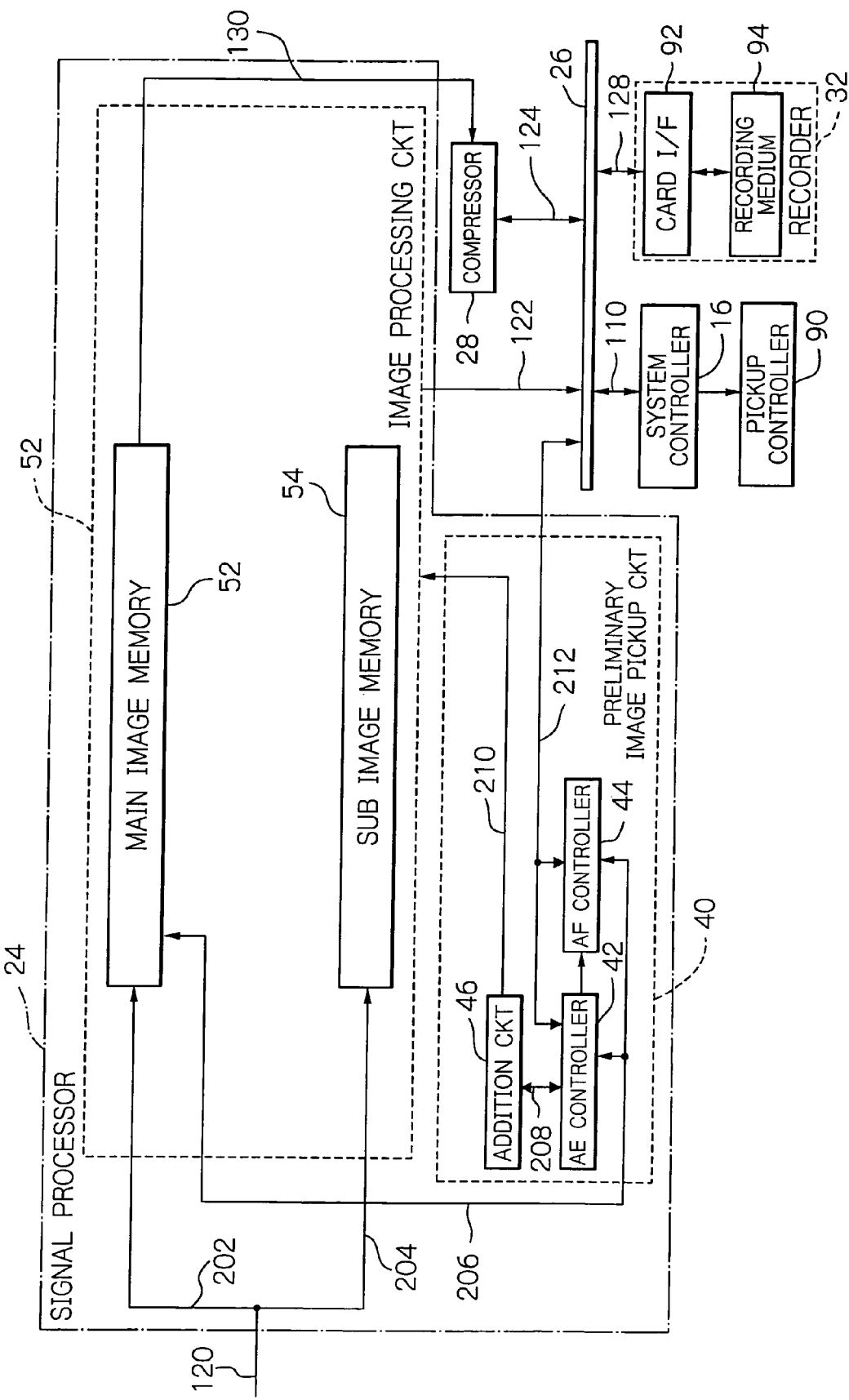
FIG. 2 is a schematic block diagram showing a specific configuration of a signal processor included in the illustrative embodiment shown in FIG. 1.

If desired, the system controller 16 may include a CPU (Central Processing Unit) not shown. Further, as shown in FIG. 2, the system controller 16 controls a pickup controller 90 on the basis of AE control information and AF control information fed from an AE controller 42 and an AF controller 44, respectively.

Referring again to FIG. 1, the timing generator 18 includes a clock oscillator, not shown, for generating a basic or system clock 112 on the basis of which the image pickup apparatus 10 operates. The timing generator 18 delivers the basic clock 112 to the system controller 16 and to the almost all of the components in the apparatus 10 as well, although not shown specifically in FIG. 1, in response to the control signal 108 fed from the system controller 16.

Further, in the illustrative embodiment, the timing generator 16 generates various timing signals by dividing the basic clock in response to the control signal 108 outputted from the system controller 16. For example, the timing signal generator 18 feeds a timing signal 114 including a vertical and a horizontal sync signal and electronic shutter drive pulses to the image pickup section 20. Also, the timing signal generator 18 feeds a timing signal 116 including sampling pulses for correlated double sampling and a conversion clock for analog-to-digital conversion to the preprocessor 22.

Figure 4:
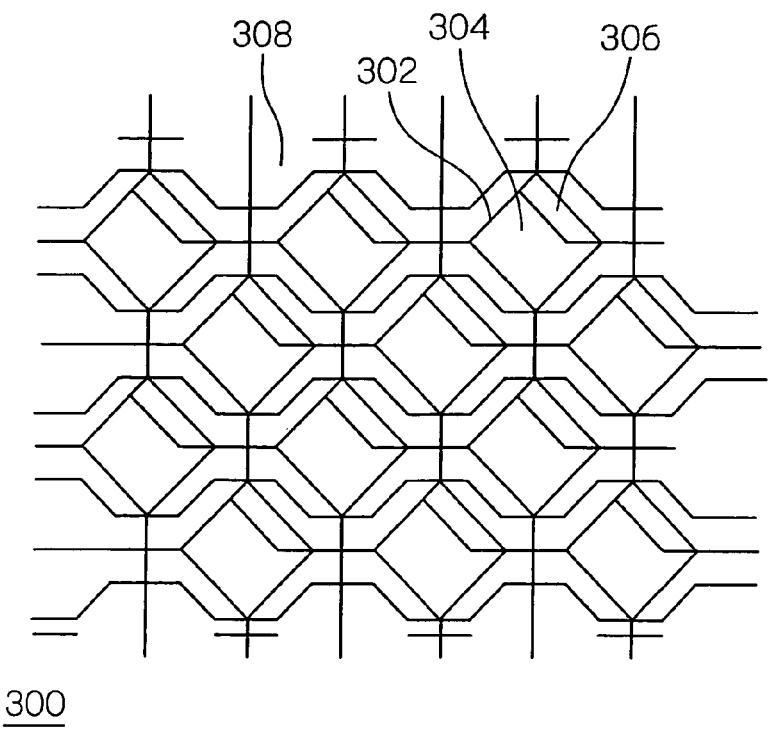
FIG. 4 schematically shows part of photo-sensors arranged in an image pickup section also included in the illustrative embodiment.

The image pickup section 20 includes a photosensitive cell array 300, corresponding to a single frame of picture picked up, and a horizontal transfer path not shown. FIG. 4 shows part of a photosensitive cell array 300 including a plurality of photo-sensors 302 and vertical transfer paths 308. Each of the photo-sensors 302 corresponds to a particular pixel. The image pickup section 20 photoelectrically transduces light incident to the photosensitive cell array 300 to a corresponding electric signal 118, see FIG. 1. The photosensitive cell array 300 corresponds to an image capturing field. In the illustrative embodiment, the image pickup section 20 may be implemented by any suitable image sensor, e.g. a CCD (Charge Coupled Device) or a MOS (Metal Oxide Semiconductor) image sensor. As shown in FIG. 1, the image pickup section 20 is controlled in response to the timing signal 114 so that light 102 incident from a subject field via the optics 12 is photoelectrically transduced to corresponding signal charges by the photo-sensors 302. In the image pickup section 20, the signal charges is then transformed to a corresponding analog electric signal 118 and outputted to the preprocessor 22.

More specifically, the photo-sensors 302 may be arranged in a so-called honeycomb pattern, in which each photo-sensor 302 are shifted from nearby photo-sensors 302 by a distance half as long as the pitch of the photo-sensors in the row or column direction on the photosensitive array 300. Alternatively, the photosensitive array 300 may be adapted such that the photo-sensors 302 are arranged in a square matrix pattern at a fixed pitch in the row and column directions, if desired. In the illustrative embodiment, each photo-sensor 302 is made up of a primary cell or high-sensitivity region 304 and a secondary cell or low-sensitivity region 306. The primary cell 304 and secondary cell 306, each photoelectrically transducing incident light to a corresponding electric signal representative of the quantity or intensity of incident light, may be implemented by photodiodes by way of example. With this configuration, the image pickup section 20 is capable of outputting the analog electric signal 118 containing both of main image data and subsidiary image data derived from the primary cell 304 and secondary cell 306, respectively.

The image pickup section 20 may be configured to transform, in a preliminary pickup step, the quantity of incident light to a photometry signal while reducing, or thinning out, pixels for rapid read-out to output the photometry signal, whereas reading out, in an actual pickup step following the preliminary pickup step, image signals from the whole pixels of the photosensitive cell array to output the entire signals.

As shown in FIG. 1, the preprocessor 22 executes analog signal processing on the analog electric signal 118 representative of an image in response to the timing signal 116 for thereby outputting a resulting digital image signal 120. The preprocessor 22 may include a CDS (Correlated Double Sampling) circuit, a GCA (Gain Controlled Amplifier), an AD (Analog-to-Digital) converter and so forth, although not shown specifically.

The signal processor 24 performs digital signal processing on the digital image signal 120 inputted from the preprocessor 22 for thereby outputting resulting digital image signals 122 and 130. The digital image signals 122 and 130 are fed to the bus 26 and compressor 28, respectively. More specifically, in the illustrative embodiment, the signal processor 24 receives the digital image signal 120 containing the main and subsidiary image data from the preprocessor 22 and effects digital signal processing in response to a control signal 122, which is the control signal 110 received from the system controller 16 over the bus 26.

FIG. 2 shows a specific configuration of the signal processor 24. As shown, the digital image signal 120 inputted to the signal processor 24 is separated into main image data 202 and subsidiary image data 204. The main image data 202 and subsidiary image data 204 thus separated are temporarily stored in a main image memory 52 and a subsidiary image memory 54, respectively, on a pixel-by-pixel basis. A preliminary pickup circuit 40 performs AF control, AE control and other preliminary pickup operations, in the preliminary pickup step, on the basis of main image data 206 outputted from the main image memory 52. An image processing circuit 50 generates a digital image signal in the actual pickup step on the basis of the main and subsidiary image data stored in the image memories 52 and 54, respectively.

The preliminary pickup circuit 40 includes an AE controller 42 and an AF controller 44, in which AE and AF control information is determined based on the main image data 206 from the main image memory 52. Particularly, the preliminary pickup circuit 40 includes an addition circuit 46 for generating shading correction information and stores it in a RAM (Random Access Memory) 70 of the image processing circuit 50. The shading correction information may be generated in accordance with the AE control information by the system controller 16.

Figure 7:
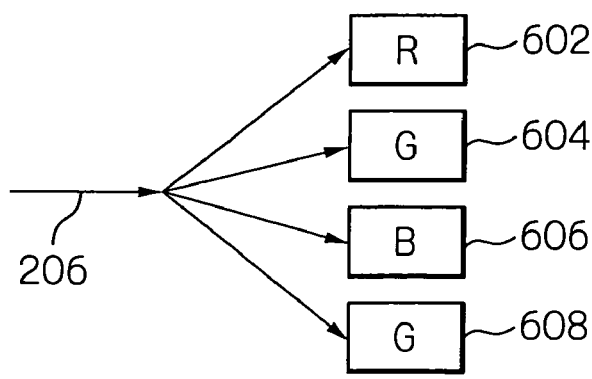
FIG. 7 shows R, G and B image data included in main image data generated in the illustrative embodiment.

More specifically, the preliminary pickup circuit 40 receives the main image data, i.e. a photometry signal 206 read out from the main image memory 52 in the preliminary pickup step. The preliminary pickup circuit 40 may be configured to separate, as shown in FIG. 7, the main image data 206 into 256 pieces of R image data 602, 256 pieces of G image data 604 and 256 pieces of B image data 606 for processing. The preliminary pickup circuit 40 may deal with the thus separated photometry signal 206 even when actual pickup step is effected without the intermediary of preliminary pickup step. Further, when green image data G included in the photometry signal 206 are greater in the number of pixels than the image data of the other colors, e.g. two times as much as the image data of the other colors, the preliminary pickup circuit 40 may subdivide the image data G into green image data 604 and 608. The preliminary pickup circuit 40 so adjusts the photometry signal 206 as to establish an exposure condition in which a white blur is not involved, i.e. a picture is not picked up beyond the dynamic range, thereby generating shading correction information under optimum pickup conditions.

Figure 5:
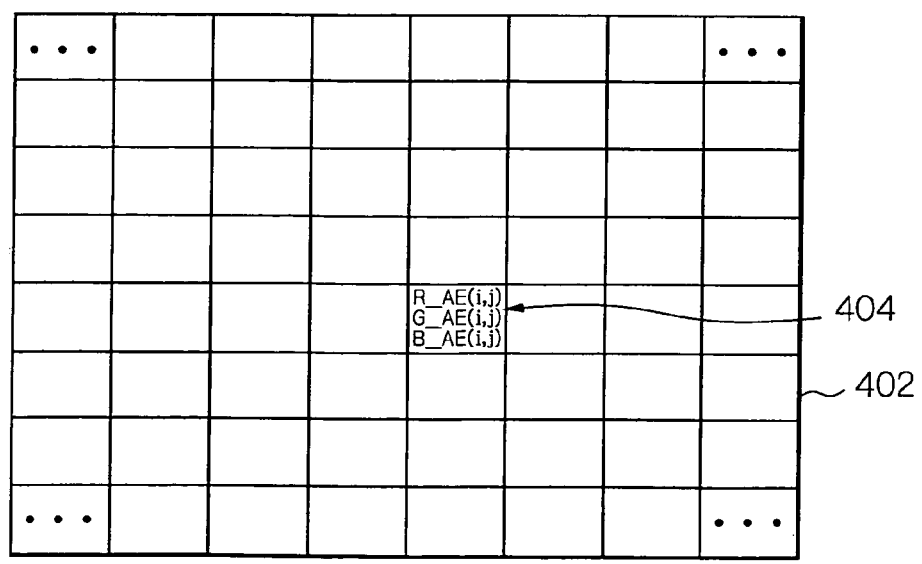
FIG. 5 shows a specific image represented by a photometry signal generated in the illustrative embodiment and divided into a plurality of blocks.

In the preliminary pickup circuit 40, an AE controller 42 divides an image represented by the photometry signal 206 into a preselected number of blocks and determines an exposure condition for accomplishing optimum automatic exposure. The preselected number mentioned above is one or above, but smaller than the number of pixels, and may be selectable. For example, as shown in FIG. 5, the entire image 402 represented by the photometry signal 206 may be divided into 8*8 blocks, i.e. sixty-four blocks, in which case the AE controller 42 effects divided photometry such that an integrated luminance value is produced in each of the sixty-four blocks. More specifically, the AE controller 42 adds data from pixels lying in each block to thereby calculate an addition block 404, which includes R photometry data R_AE(i,j), G photometry data G_AE(i,j) and B photometry data B_AE(i,j). It is to be noted that letters i and j are indices representative of the x and y coordinates of the addition block 404, respectively, and initially zero each.

To narrow down an exposure condition in accordance with the photometry data R_AE(i,j), G_AE(i,j) and B_AE(i,j), the AE controller 42 calculates block by block:

$$Y\_AE(i, j) = 0.301 * R\_gain(fine) * R\_AE(i, j) +$$
$$0.590 * G\_gain(fine) * G\_AE(i, j) +$$
$$0.109 * B\_gain(fine) * B\_AE(i, j)$$

In the above expression, R_gain(fine), G_gain(fine and B_gain(fine) are gain values for fine days and assigned to red pixels, green pixels and blue pixels, respectively. To narrow down an exposure condition, the weighted mean of Y_AE(i,j) may be used as an evaluation function; when priority is given to the center of the frame by way of example, importance is attached to Y_AE(i,j) around the center of the frame. The AE controller 42 feeds the system controller 16 with AE control information derived from the exposure condition thus determined.

An AF controller 44 also included in the preliminary pickup circuit 40 produces AF control information controlling a diaphragm, a shutter speed and so on, in response to the photometry signal 206 and exposure information derived from the AE control circuit 42. The AF control information is also outputted to the system controller 16. An addition circuit 46 determines shading correction information in accordance with the photometry data R_AE(i,j), G_AE(i,j) and B_AE(i,j) derived from the AE controller 42 block by block and writes in the information into a RAM (Random Access Memory) 70, which is included in the image processing circuit 50. In the illustrative embodiment, the addition circuit 46 calculates tints R_AE(i,j)/G_AE(i,j) and B_AE(i,j)/G_AE(i,j) and then stores the tints in the RAM 70, e.g. as shading correction information.

Figure 3:
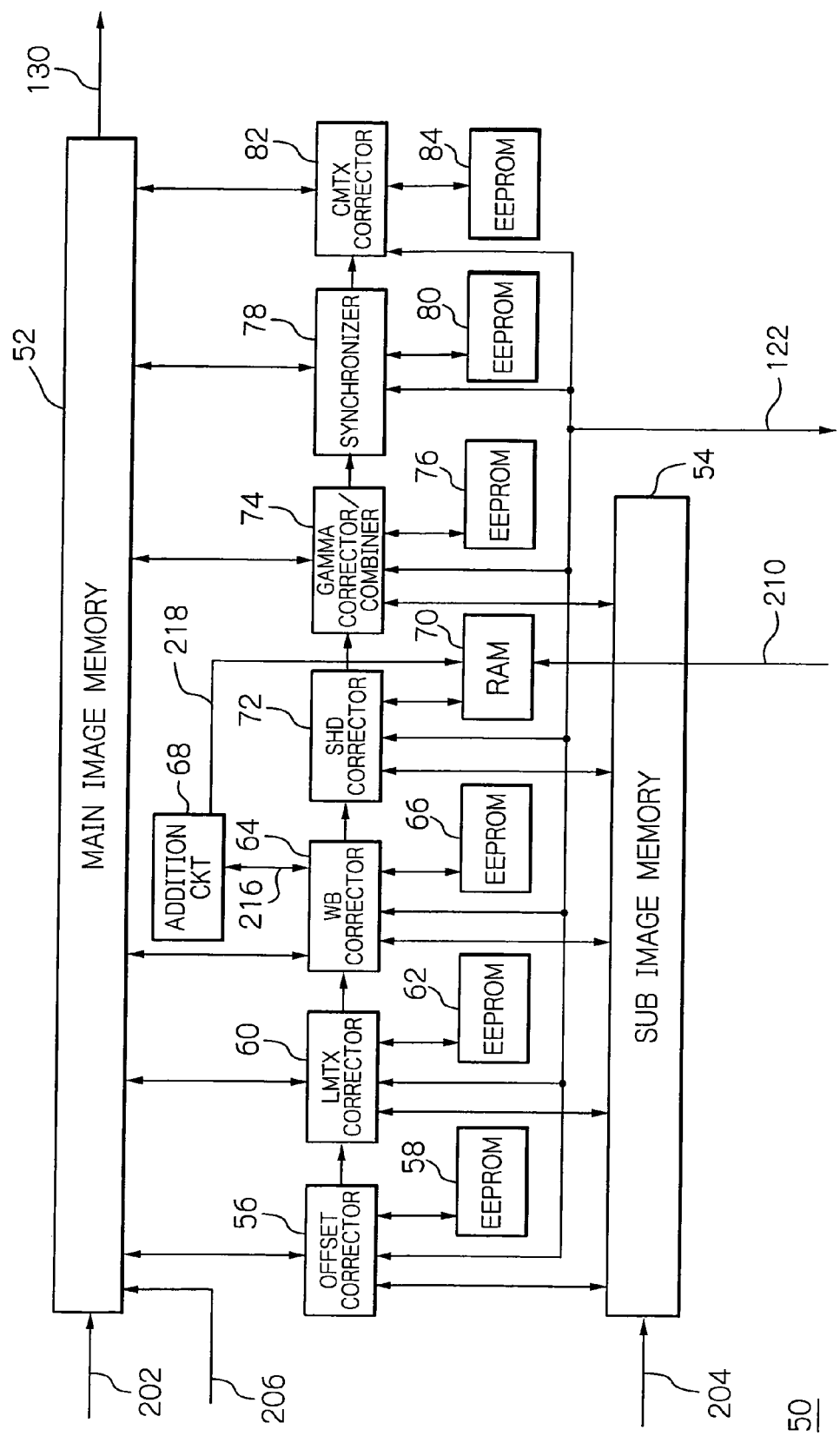
FIG. 3 is a schematic block diagram showing a specific configuration of an image processing circuit shown in FIG. 2.

As shown in FIG. 3, the image processing circuit 50 includes an offset corrector 56, an LMTX (Linear Matrix) corrector 60 and a WB (White Balance) corrector 64 cooperating to correct the main image data and subsidiary image data stored in the main image memory 52 and subsidiary image memory 54, respectively. In the illustrative embodiment, the offset corrector 56, LMTX correct or 60 and WB corrector 64 are connected to EEPROMs (Electrically Erasable Programmable Read-Only Memory) 58, 62 and 66, respectively.

An SHD (Shading) corrector 72 also included in the image processing circuit 50 compensates for color shading, particularly color shading of the subsidiary image data in the illustrative embodiment in accordance with the shading correction information stored in the RAM 70. This color shading should preferably be compensated for at least after the subsidiary image data have been subjected to offset correction. The SHD corrector 72 may additionally compensate for luminance shading of the main image data and subsidiary image data stored in the main image memory 52 and subsidiary image memory 54, respectively.

The SHD corrector 72 will compensate for color shading as described more specifically hereinafter. For color shading correction, the subsidiary image data stored in the subsidiary image memory 54 are divided in matching relation to the specific addition blocks shown in FIG. 5. The SHD corrector 72 adds subsidiary image data block by block to thereby produce R subsidiary image data r(i,j), G subsidiary image data g(i,j) and B subsidiary image data b(i,j) and then calculates subsidiary image data tints r(i,j)/g(i,j) and b(i,j)/g(i,j) block by block. Further, by obtaining photometry data tints R_AE(i,j)/G_AE(i,j) and B_AE(i,j)/G_AE(i,j) from the RAM 70, the SHD corrector 72 calculates comparative gains r_gain(i,j) and b_gain(i,j) block by block in accordance with the subsidiary image data and photometry data tints by using the following expressions (1) and (2):

$$r\_gain(i,j)=(R\_AE(i,j)/G\_AE(i,j))/(r(i,j)/g(i,j)) \quad (1)$$

$$b\_gain(i,j)=(B\_AE(i,j)/G\_AE(i,j))/(b(i,j)/g(i,j)) \quad (2)$$

The comparative gains r_gain(i,j) and b_gain(i,j) are necessary for matching the average subsidiary image data tint to the average main image data tint corresponding thereto.

Figure 6:
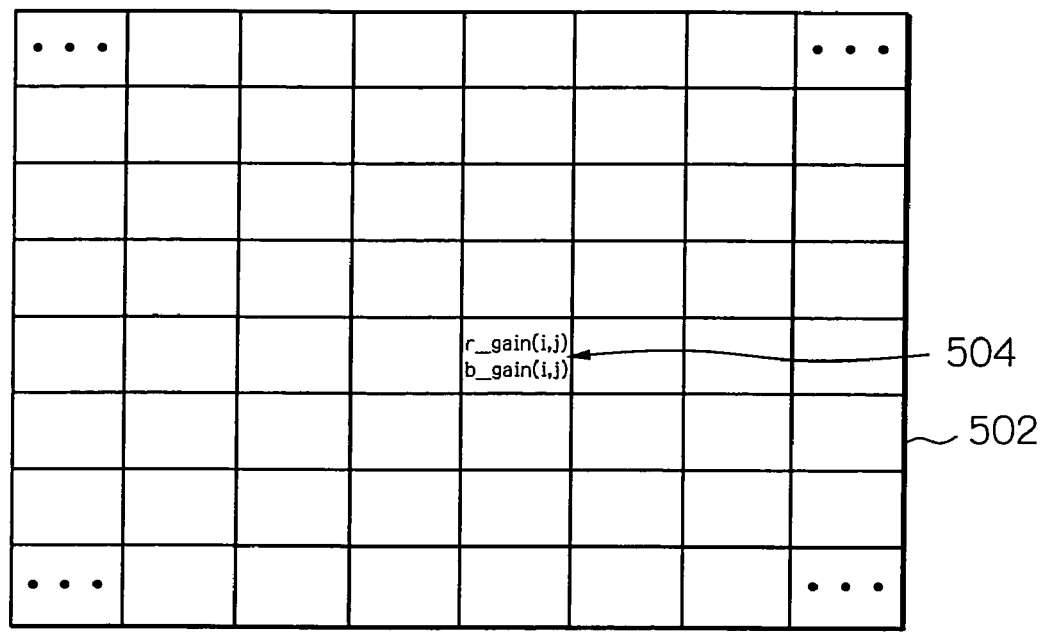
FIG. 6 shows an image represented by subsidiary image data generated in the illustrative embodiment and divided blocks in matching relation to the image of FIG. 5.

As shown in FIG. 6, in the illustrative embodiment, the SHD corrector 72 matches comparative gains 504 represented by r_gain(i,j) and b_gain(i,j) to the addition blocks to thereby produce a comparative gain image 502, which corresponds to the image 402 of FIG. 5. The SHD corrector 72 smoothly, bidimensionally interpolates the comparative gains 504, i.e. r_gain(i,j) and b_(i,j) by expanding them on a pixel basis by, e.g. spline interpolation while applying the gains pixel by pixel.

Assume that the SHD corrector 72 interpolates the comparative gains in the vertical and horizontal directions on an image by tridimensional spline interpolation by way of example. Then, if an interpolation image has 2,400*1,600 pixels, the comparative gains r_gain(i,j) and b_gain(i,j) are produced by:

$$r\_gain(i,j)=r\_gain\_hokan(150+300i, 100+200i) \quad (3)$$

$$b\_gain(i,j)=b\_gain\_hokan(150+300i, 100+200i) \quad (4)$$

In the above expressions (3) and (4), r_gain_hokan and b_gain_hokan are representative of shading correction gains to be determined for each pixel. Assuming that a given pixel is indicated by x and y coordinates, then shading correction gains r_gain_hokan(x,y) and b_gain_hokan(x,y) assigned to the pixel are expressed as:

$$r\_gain\_hokan(x, y) = P(j-1)*(y-100-200j)* \quad (5)$$
$$(200^2 - (y-100-200j)^2)/(6*200) +$$
$$P(j)*(y+100-200j)*((y-100-200j)^2 - 200^2)/(6*200) -$$
$$r\_gain\_hokanX(x, j-1)*(y-100-200j)/200 +$$
$$r\_gain\_hokanX(x, j)*(y+100-200j)/200$$

$$b\_gain\_hokan(x, y) = Q(j-1)*(y-100-200y)* \quad (6)$$
$$(200^2 - (x-100-200j)^2)/(6*200) +$$
$$Q(j)*(y+100-200j)*((y-100-200j)^2 - 200^2)/(6*200) -$$
$$b\_gain\_hokanX(x, j-1)*(y-100-200j)/200 +$$
$$b\_gain\_hokanX(x, j)*(y+100-200j)/200$$

The functions r_gain_hokanX(x,j) and b_gain_hokanX(x, j) included in the expressions (5) and (6), respectively, are expressed as:

$$r\_gain\_hokanX(x, j) = M(i-1)*(x-150-300i)* \quad (7)$$
$$(300^2 - (x-150-300i)^2)/(6*300) +$$
$$M(i)*(x+150-300i)*((x-150-300i)^2 - 300^2)/(6*300) -$$
$$r\_gain(i-1, j)*(x-150-300i)/300 +$$
$$r\_gain(i, j)*(x+150-300i)/300$$

$$b\_gain\_hokanX(x, j) = N(i-1)*(x-150-300i)* \quad (8)$$
$$(300^2 - (x-150-300i)^2)/(6*300) +$$
$$N(i)*(x+150-300i)*((x-150-300i)^2 - 300^2)/(6*300) -$$
$$b\_gain(i-1, j)*(x-150-300i)/300 +$$
$$b\_gain(i, j)*(x+150-300i)/300$$

Further, the functions M(k), N(i), P(j) and Q(j) included in the above expressions (7) and (8) satisfy the following expressions:

$$\begin{pmatrix} 4 & 1 & 0 & 0 & 0 & 0 \\ 1 & 4 & 1 & 0 & 0 & 0 \\ 0 & 1 & 4 & 1 & 0 & 0 \\ 0 & 0 & 1 & 4 & 1 & 0 \\ 0 & 0 & 0 & 1 & 4 & 1 \\ 0 & 0 & 0 & 0 & 1 & 4 \end{pmatrix} \begin{pmatrix} M(1) \\ M(2) \\ M(3) \\ M(4) \\ M(5) \\ M(6) \end{pmatrix} = \begin{pmatrix} m(1) \\ m(2) \\ m(3) \\ m(4) \\ m(5) \\ m(6) \end{pmatrix} m(i) = \quad (9)$$

$$\frac{6}{300^2}(r\_gain(i+1, j) - 2r\_gain(i, j) + r\_gain(i-1, j))$$

$$\begin{pmatrix} 4 & 1 & 0 & 0 & 0 & 0 \\ 1 & 4 & 1 & 0 & 0 & 0 \\ 0 & 1 & 4 & 1 & 0 & 0 \\ 0 & 0 & 1 & 4 & 1 & 0 \\ 0 & 0 & 0 & 1 & 4 & 1 \\ 0 & 0 & 0 & 0 & 1 & 4 \end{pmatrix} \begin{pmatrix} N(1) \\ N(2) \\ N(3) \\ N(4) \\ N(5) \\ N(6) \end{pmatrix} = \begin{pmatrix} n(1) \\ n(2) \\ n(3) \\ n(4) \\ n(5) \\ n(6) \end{pmatrix} n(i) = \quad (10)$$

$$\frac{6}{300^2}(b\_gain(i+1, j) - 2b\_gain(i, j) + b\_gain(i-1, j))$$

$$\begin{pmatrix} 4 & 1 & 0 & 0 & 0 & 0 \\ 1 & 4 & 1 & 0 & 0 & 0 \\ 0 & 1 & 4 & 1 & 0 & 0 \\ 0 & 0 & 1 & 4 & 1 & 0 \\ 0 & 0 & 0 & 1 & 4 & 1 \\ 0 & 0 & 0 & 0 & 1 & 4 \end{pmatrix} \begin{pmatrix} P(1) \\ P(2) \\ P(3) \\ P(4) \\ P(5) \\ P(6) \end{pmatrix} = \quad (11)$$

$$\begin{pmatrix} p(1) \\ p(2) \\ p(3) \\ p(4) \\ p(5) \\ p(6) \end{pmatrix} p(j) = \frac{6}{300^2}(r\_gain\_hokanX(x, j+1) -$$

$$2r\_gain\_hokanX(x, j+1) + r\_gain(x, j+1))$$

$$\begin{pmatrix} 4 & 1 & 0 & 0 & 0 & 0 \\ 1 & 4 & 1 & 0 & 0 & 0 \\ 0 & 1 & 4 & 1 & 0 & 0 \\ 0 & 0 & 1 & 4 & 1 & 0 \\ 0 & 0 & 0 & 1 & 4 & 1 \\ 0 & 0 & 0 & 0 & 1 & 4 \end{pmatrix} \begin{pmatrix} Q(1) \\ Q(2) \\ Q(3) \\ Q(4) \\ Q(5) \\ Q(6) \end{pmatrix} = \begin{pmatrix} q(1) \\ q(2) \\ q(3) \\ q(4) \\ q(5) \\ q(6) \end{pmatrix} q(j) = \quad (12)$$

$$\frac{6}{200^2}(b\_gain\_hokanX(x, j+1) - 2b\_gain$$
$$\_hokanX(x, j+1) + r\_gain(x, j+1))$$

The SHD corrector 72 compensates for, based on the shading correction gains r_gain_hokan(x,y) and b_gain_hokan(x, y), the shading of the subsidiary image data r(x,y) and b(x,y) stored in the subsidiary image memory 54 pixel by pixel by using the following expressions (13) and (14):

$$r'(x,y) = r\_gain\_hokan(x,y)*r(x,y) \quad (13)$$

$$b'(x,y) = b\_gain\_hokan(x,y)*b(x,y) \quad (14)$$

In the image processing circuit 50, a γ (gamma) corrector/combiner 74 executes gamma correction with the main and subsidiary image data subjected to shading correction described above and combines the resulting image data. A synchronizer 78 synchronizes a digital image signal, after combined, outputted from the y corrector/combiner 74 while a CMTX (Color Matrix) corrector 82 adjusts the colors of the digital image signal thus synchronized. In the illustrative embodiment, the γ corrector/combiner 74, synchronizer 78 and CMTX corrector 82 are connected to EEPROMs 76, 80 and 84, respectively.

The image processing circuit 50 delivers the digital image signal 122 generated by the procedure described above to the compressor 28, monitor 30 and recorder 32 over the bus 26. In the illustrative embodiment, the compressor 28, monitor 30 and recorder 32 are controlled by the control signal 110 fed from the system controller 16 via the bus 26. If desired, the image processing circuit 50 may be connected to the compressor 28 without the intermediary of the bus 26 and feed a digital image signal 130 to the compressor 28.

The compressor 28 compresses the digital image signal inputted thereto according to, e.g. the JPEG (Joint Photographic Experts Group) standard based upon orthogonal transform in response to the control signal 110 outputted from the system controller 16. The resulting compressed data are delivered to, e.g. the recorder 32.

The monitor 30 visualizes on its display screen, not shown, an image represented by the digital image signal 122 fed from the signal processor 14 and may be implemented by an LCD (Liquid Crystal Display) panel by way of example.

The recorder 32 records the digital image signal input thereto. As shown in FIG. 2, in the illustrative embodiment, the recorder 32 includes a card interface (I/F) 92 and a recording medium 94 and may write in the compressed image signal outputted from the compressor 28 into the recording medium 94 via the card interface 92. For the recording medium 94, use may be made of a memory card loaded with a semiconductor memory device or a drive package containing, e.g. a magneto-optical disk or similar disk-like recording body. Such a recording medium may be removably mounted to the recorder 32, if desired.

Figure 8:
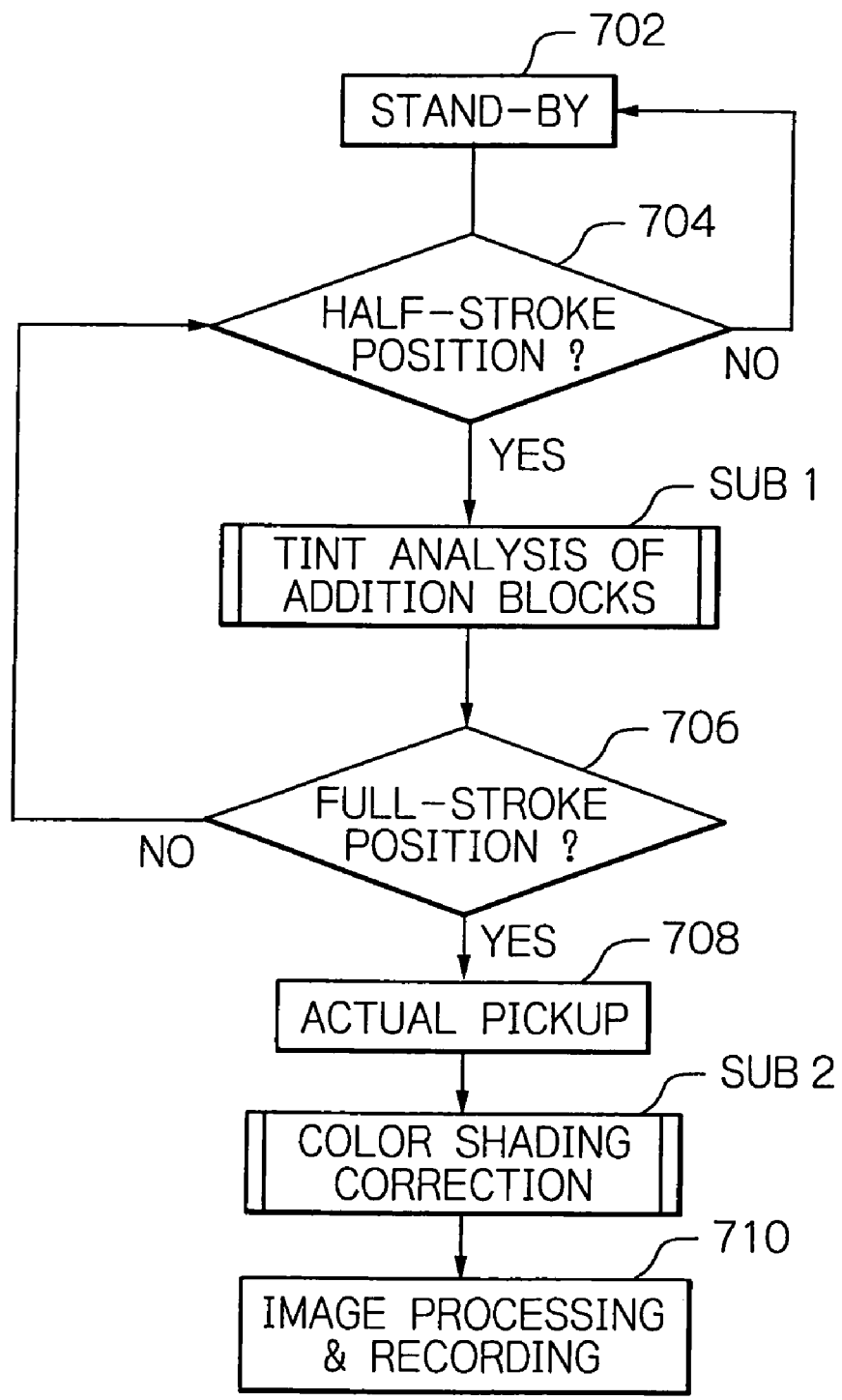
FIG. 8 is a flowchart useful for understanding a specific operation of the illustrative embodiment.
Figure 9:
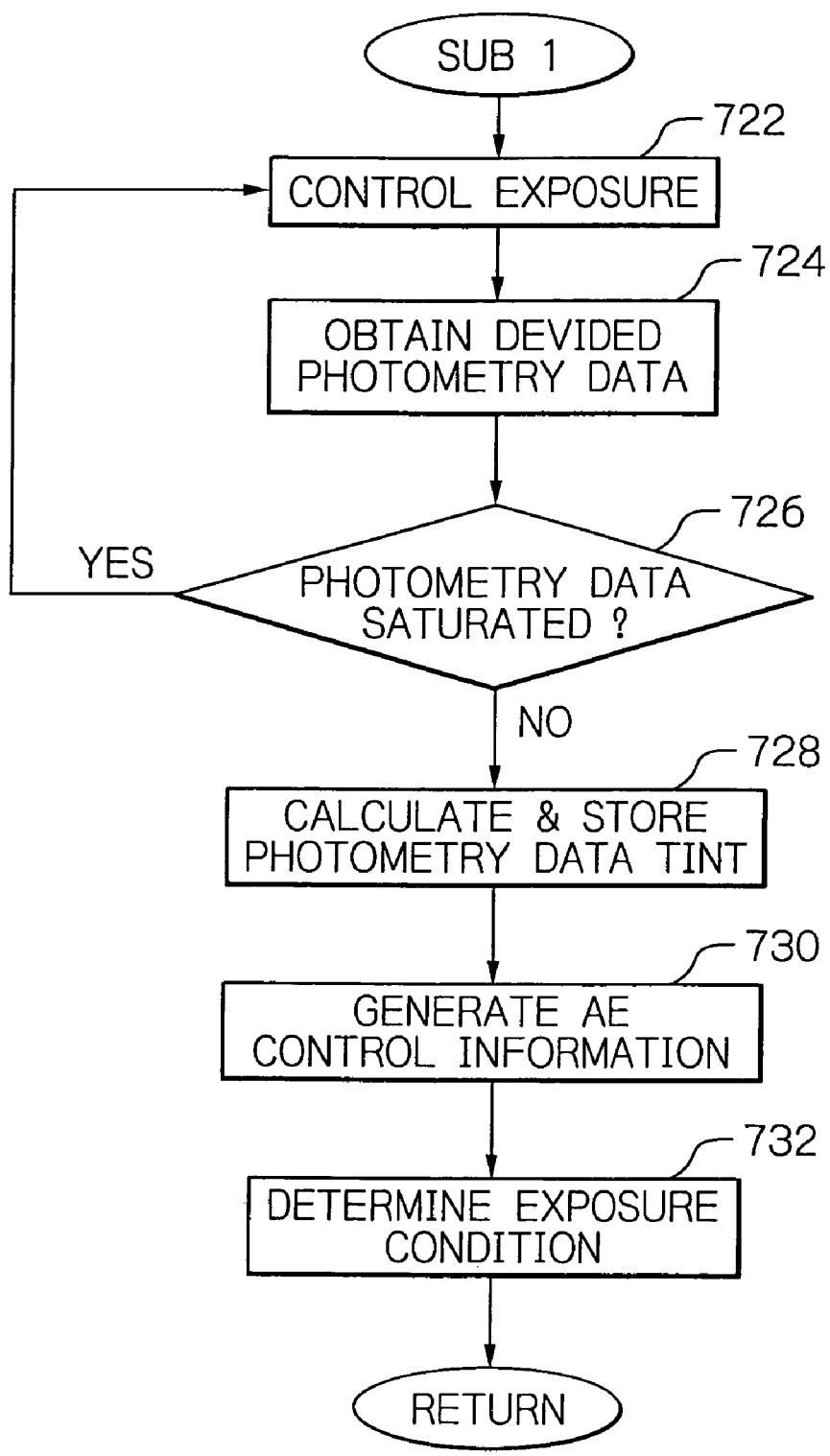
FIG. 9 is a flowchart showing a subroutine included in the operation of FIG. 8 in detail.
Figure 10:
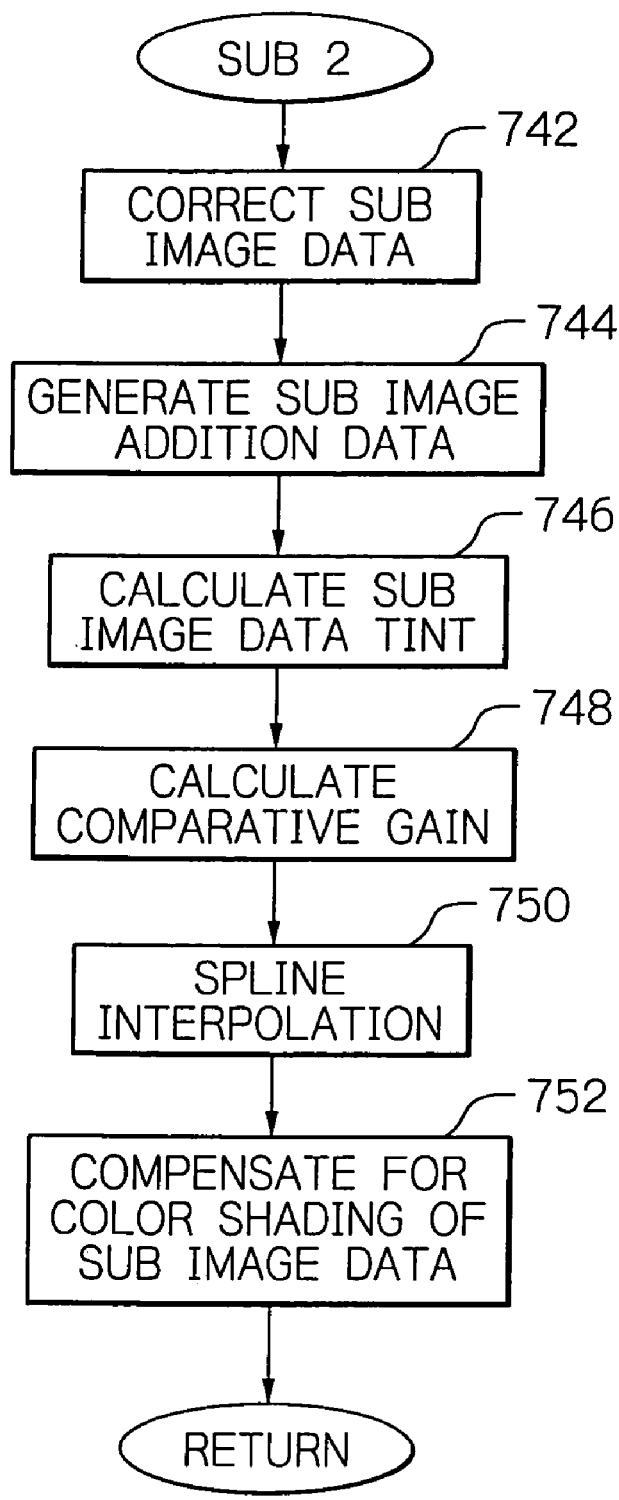
FIG. 10 is a flowchart showing another subroutine included in the operation of FIG. 8 in detail.

Reference will be made to FIGS. 8, 9 and 10 for describing a specific operation of the solid-state image pickup apparatus 10. As shown in FIG. 8, assume that the user of the apparatus 10 depresses the shutter release button of the control panel 14 when the apparatus 10 is held in its stand-by state (step 702). Then, whether or not the shutter release button is depressed to its half-stroke position is determined (step 704). If the answer of the step S704 is positive (YES), there is executed the tint analysis of the addition blocks (subroutine SUB1). At the same time, the signal 104, commanding photometry, is fed from the control panel 14 to the system controller 16. On the other hand, if the answer of the step 704 is negative (NO), the procedure returns to the step 702.

As shown in FIG. 9, the subroutine SUB1 begins with exposure control (step 722). At this stage, exposure may be controlled in the initial exposure condition.

After the step 722, photometry data are obtained (step 724), so that AE and AF control are executed by the divided photometry. At this instant, the system controller 16 generates the control signals 106 and 108, including a photometry command, in accordance with an exposure state determined by AE control of the step 722 and delivers the signals 106 and 108 to the optics 12 and timing generator 18, respectively. In response, the timing generator 18 generates the timing signals 112, 114 and 116 including a photometry command, in response to the control signal 108, and feeds the signals 112, 114 and 116 to the system controller 16, image pickup section 20 and preprocessor 22, respectively.

Light 102 coming from a subject field is incident to the image pickup section 20 via the optics 12, so that the image of the field is focused on the photosensitive array 300, FIG. 4, of the image pickup section 20. In the image pickup section 20, signal charges for photometry on the photosensitive array 300 are read out in response to the timing signal 114. At this instant, signal charges may be read out only from the primary cell 304 of the individual photo-sensors 302 or reduced, or thinned out, for rapid read-out. The resulting analog electric signal, or photometry signal, 118 is fed from the image pickup section 20 to the preprocessor 22.

The preprocessor 22 executes CDS, GCA and AD conversion and other preprocessing on the analog electric signal 118 in response to the timing signal 116 to thereby generate a digital image signal 120 and delivers the signal 120 to the signal processor 24. In the signal processor 24, main image data 202 and subsidiary image data 204 separated from the image signal 120 are written into the main image memory 52 and subsidiary image memory 54, respectively.

In the illustrative embodiment, the photometry signal 206 is fed from the main image memory 52 to the preliminary image pickup circuit 40 in the form of R, G and B photometry data. In the preliminary image pickup circuit 40, the photometry signal 206 is inputted to the AE controller 42 and used to effect AE control in the preliminary pickup mode. The AE controller 42, in turn, delivers the resulting AE control information to the system controller 14 and AF controller 44. The AF controller 44 performs AF control in accordance with the AE control information and photometry signal 206.

In the divided photometry executed by the AE controller 42, the image 402 represented by the photometry signal 206, FIG. 5, is divided into sixty-four addition blocks 404 by way of example. In this condition, pixel data lying in each addition block 404 are added so as to produce photometry data. Subsequently, AE control information derived from the photometry data thus generated block by block are delivered to the system controller 14.

After the step S724, whether or not the photometry data lie in the dynamic range is determined block by block (step 726). More specifically, in the illustrative embodiment, R, G and B photometry data $R\_AE(i,j)$, $G\_AE(i,j)$ and $B\_AE(i,j)$ are compared with a saturation maximum value EVMAX assigned to the primary cells 304 of the photo-sensors 302. In the illustrative embodiment, if the three kinds of photometry data all are smaller than the saturation maximum value EVMAX (NO, step 726), it is determined that the exposure condition is optimum. This is followed by a step 728 for the calculation and storage of tints. If the answer of the step 726 is YES, the procedure returns to the step S722 so as to repeat exposure control.

In the second and successive times of exposure control (step 722), the AE controller 42 produces a new exposure condition controlled such that any one of the current photometry data greater than the saturation maximum value EVMAX becomes smaller than the maximum value EVMAX. The AE controller 42 then feeds AE control information based on the new exposure condition to the system controller 16. In this manner, the exposure control (step 722) and the calculation of photometry data (step 724) are repeated until an exposure condition that prevents main image data from exceeding the dynamic range has been determined.

In the step 728, the R, G and B photometry data $R\_AE(i,j)$, $G\_AE(i,j)$ and $B\_AE(i,j)$ are input to the addition circuit 46 of the preliminary pickup circuit 40. In response, the preliminary pickup circuit 40 calculates the above photometry data tints $R\_AE(i,j)/G\_AE(i,j)$ and $B\_AE(i,j)/G\_AE(i,j)$ and then stores the tints in the RAM 70 as shading correction data.

After the step 728, the AE controller 42 generates AE control information for actual pickup on the basis of the current exposure condition in which all photometry data are smaller than the saturation maximum value EVMAX (step 730). Subsequently, the system controller determines an exposure condition for actual pickup in accordance with the above AE control information inputted thereto (step 732). This is the end of the subroutine SUB1.

Referring again to FIG. 8, after the subroutine SUB1, whether or not the shutter release button is depressed to its full-stroke position is determined (step 708). If the answer of the step 708 is YES, actual pickup is executed (step 708), or otherwise the procedure returns to the step 704.

In the step 708, the system controller 16 generates control signals 106 and 108, including an actual pickup command, in accordance with the exposure condition determined in the step 732, FIG. 9, and delivers the control signals 106 and 108 to the optics 12 and timing generator 18, respectively. Timing signal generator 18 generates timing signals 112, 114 and 116, including a photometry command, in response to the control signal 108 and feeds the timing signals 112, 114 and 116 to the system controller 16, image pickup section 20 and preprocessor 22, respectively.

Light 102 is incident from the subject field to the image pickup section 20 via the optics 12, so that the image of the field is focused on the photosensitive array 300. Subsequently, an analog electric signal 118, derived from signal charges read out from the photo-sensors 302 in response to the timing signal 114, is fed from the image pickup section 20 to the preprocessor 22. The preprocessor 22 executes CDS, GCA and AD conversion and other preprocessing on the analog electric signal 118 for thereby outputting a digital image signal 120. The digital image signal 120 is fed to the signal processor 24.

The signal processor 24 separates the input digital image signal 120 into main image data 202 and subsidiary image data 204 and writes in the image data 202 and 204 into the main image memory 52 and subsidiary image memory 54, respectively. The main image data 202 are then read out from the main image memory 52 and fed to the offset corrector 56, LMTX corrector 60 and WB corrector 64. Particularly, in the illustrative embodiment, the subsidiary image data 204 read out form the subsidiary image memory 54 are compensated for color shading (subroutine SUB2).

As shown in FIG. 10, in the subroutine SUB2, the subsidiary image data 204 are fed from the subsidiary image memory 54 to the offset corrector 56, LMTX corrector 60 and WB corrector 64 and then subjected to correction thereby (step 742). Subsequently, the SHD corrector 72 divides the subsidiary image data corrected by the circuits 56, 60 and 64 into the preselected number of addition blocks in the same manner as during the divided photometry effected in the preliminary pickup mode and then generates added subsidiary image data block by block (step 744). In the illustrative embodiment, the added subsidiary image data are made up of R, G and B subsidiary image data r(i,j), g(i,j) and b(i,j).

Further, the SHD corrector 72 calculates the subsidiary image data tints r(i,j)/g(i,j) and b(i,j)/g(i,j) on the basis of the subsidiary image data r(i,j), g(i,j) and b(i,j) (step 746). In addition, the SHD corrector 72 calculates comparative gains r_gain(i,j) and b_gain(i,j) by using the above expressions (1) and (2) (step 748).

After the step 748, the SHD corrector 72 performs spline interpolation, i.e. calculates shading correction gains r_gain_hokan(x,y) and b_gain_hokan(x,y) by using the above expressions (3) and (4) (step 750). Finally, the SHD corrector 72 compensates for color shading of the subsidiary image data r(x,y) and b(x,y) (step 752), which are generated in the step 742, on the basis of the shading correction gains r_gain_hokan(x,y) and b_gain_hokan(x,y). In the illustrative embodiment, for such color shading correction, use is made of the expressions (13) and (14). This is the end of the subroutine SUB2.

As shown in FIG. 8, the subroutine SUB2 is followed by a step 710 of executing image processing and recording. More specifically, in the step 710, the y corrector/combiner 74 executes gamma correction on the main image data 202 and subsidiary image data 204 stored in the main and subsidiary image memories 52 and 54, respectively, combines the image data 202 and 204 thus corrected with each other, and then writes in the resulting composite image data to the main image memory 52.

Subsequently, the composite image data are synchronized by the synchronizer 78 and then subject to CMTX correction by the CMTX corrector 82. In this manner, the signal processor 24 of the illustrative embodiment processes the digital image signal 120 and writes in the resulting image data into the main image memory 52.

When the system controller 14 controls the signal processor 24 to command image recording and display, the digital image signal 130 processed by the procedure described above is read out from the main image memory 52 and fed to the compressor 28. In response, the compressor 28 performs compression and other processing on the digital image signal 130 and causes the recorder 32 to store the image signal 130 thus compressed in the recording medium 94 while causing the monitor 30 to display it.

An alternative embodiment of the image pickup apparatus in accordance with the present invention will be described with reference also made to FIGS. 2 and 3. As shown, in the alternative embodiment, the image processing circuit 50 of the signal processor 24 additionally includes an addition circuit 68 for producing shading correction information from the main image data subjected to WB correction. In the alternative embodiment, the addition circuit 68 compares the main image data subjected to WB correction with, e.g. the maximum charge level in order to see if the former is smaller than the latter. Subsequently, the SHD corrector 72 performs, based on the result of the above comparison, shading correction on either one of the shading correction information 210 derived from the photometry data and shading correction information 218 derived from the data subjected to WB correction.

More specifically, the addition circuit 68 reads out the main image data 216 subjected to WB correction from the WB corrector 64 and then divides the main image data 216 into the preselected number of blocks in the same manner as during divided photometry effected by the AE controller 42. The addition circuit 68 then adds image data block by block for thereby calculating WB corrected data, which consist of R WB corrected data R_WB(i,j), G WB corrected data G_WB(i,j) and B WB corrected data B_WB(i,j).

Further, the addition circuit 68 uses the WB corrected data R_WB(i,j), G_WB(i,j) and B_WB(i,j) to calculate the WB corrected data tints R_WB(i,j)/G_WB(i,j) and B_WB(i,j)/G_WB(i,j), and then writes in the tints thus calculated into the RAM 70. At this instant, the addition circuit 68 compares the WB corrected data G_WB(I,j), G_WB(I,j) and B_WB(I,j) with the maximum charge level QLMAX. If the WB corrected data R_WB(I,j), G_WB(I,j) and B_WB(I,j) all are smaller than the maximum charge level QLMAX, the addition circuit 68 then commands the SHD corrector 72 to select the shading correction information 210 based on the WB corrected data. Otherwise, the addition circuit 68 commands the SHD corrector 72 to select the shading correction information 218 based on the photometry data. The addition circuit 68 may store a flag indicative of the above command in the RAM 70 so that the SHD corrector 72 ascertains this flag, or may not store the shading correction information 218 in the RAM 70 when the above condition is not satisfied so that the SHD corrector 72 ascertains whether the shading correction information 218 has been stored in the RAM 70. The SHD corrector 72 may feed such WB corrected data to the system controller 24 so as to cause it to generate shading correction data.

The SHD corrector 72 of the alternative embodiment calculates the comparative gains r_gain(i,j) and b_gain(i,j) on the basis of the subsidiary image data tints r(i,j)/g(i,j) and b(i,j)/g(i,j). At this instant, the SHD corrector 72 selectively uses the shading correction information 210 based on the photometry data or the shading correction information 218 based on the WB corrected data. For example, if the main image data saturate to cause a white blur, i.e. if at least one of the WB corrected data R_WB(i,j), G_WB(i,j) and B_WB(i,j) is greater than the maximum charge level, the SHD corrector 72 uses the shading correction information 210 and expressions (1) and (2) to calculate the comparative gains. On the other hand, if the WB correction data R_WB(i,j), G_WB(i,j) and B_WB(i,j) all are smaller than the maximum charge level, the SHD corrector 72 uses the shading correction information 218 based on the WB corrected data and the following expressions (15) and (16) to calculate the comparative gains:

$$r\_gain(i,j)=(R\_WB(i,j)/G\_WB(i,j))/(r(i,j)/g(i,j)) \quad (15)$$

$$b\_gain(i,j)=(B\_WB(i,j)/G\_WB(i,j))/(b(i,j)/g(i,j)) \quad (16)$$

In the alternative embodiment, the SHD corrector 72 calculates, based on the comparative gains r_gain(i,j) and b_gain (i,j) thus calculated, shading correction gains r_gain_hokan (x,y) and b_gain_hokan(x,y) by using the expressions (5) and (6) and executes color shading on the subsidiary image data stored in the subsidiary image memory 54 by using the expressions (13) and (14).

Figure 11:
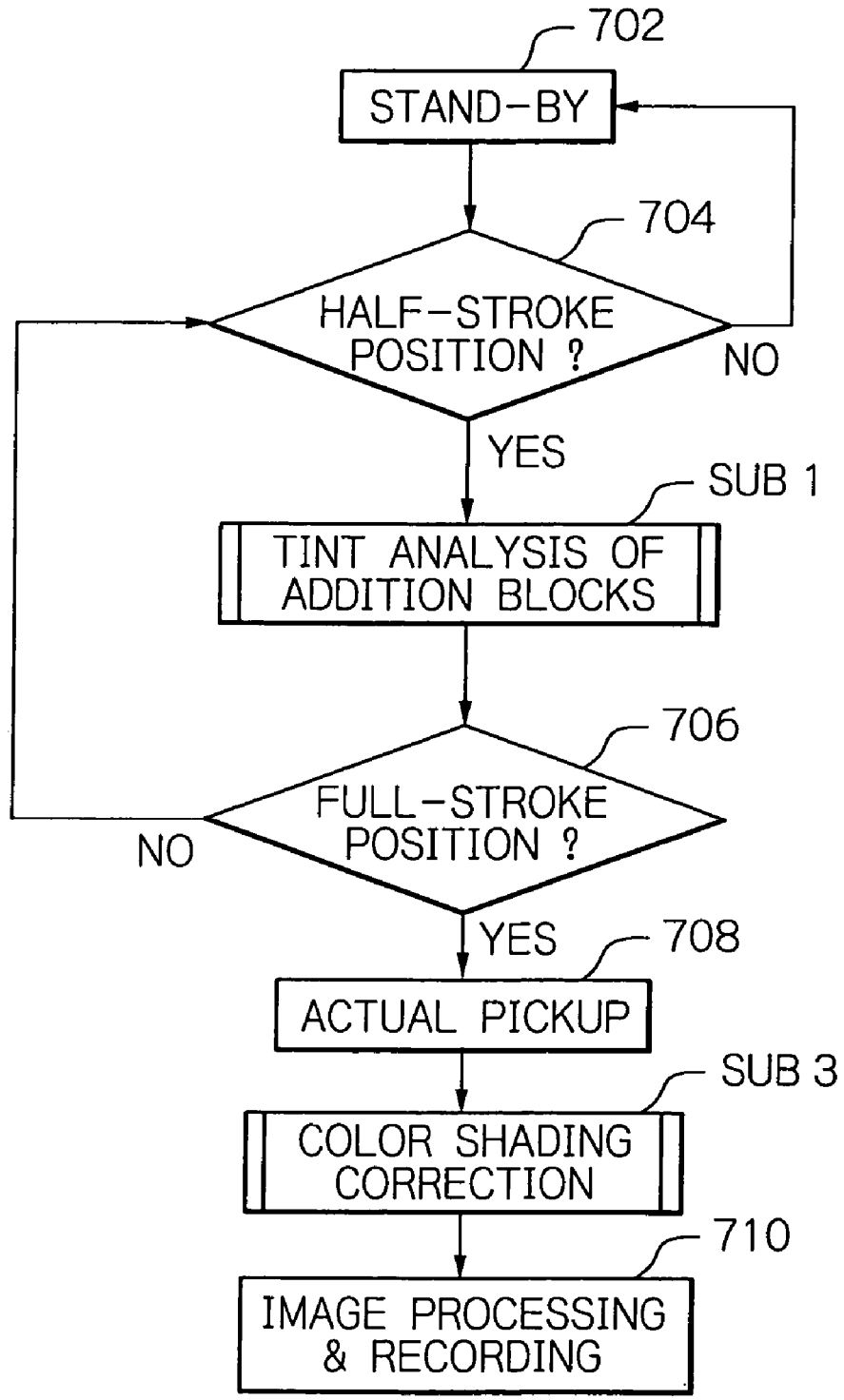
FIG. 11 is a flowchart useful for understanding the operation of an alternative embodiment of the present invention.
Figure 12:
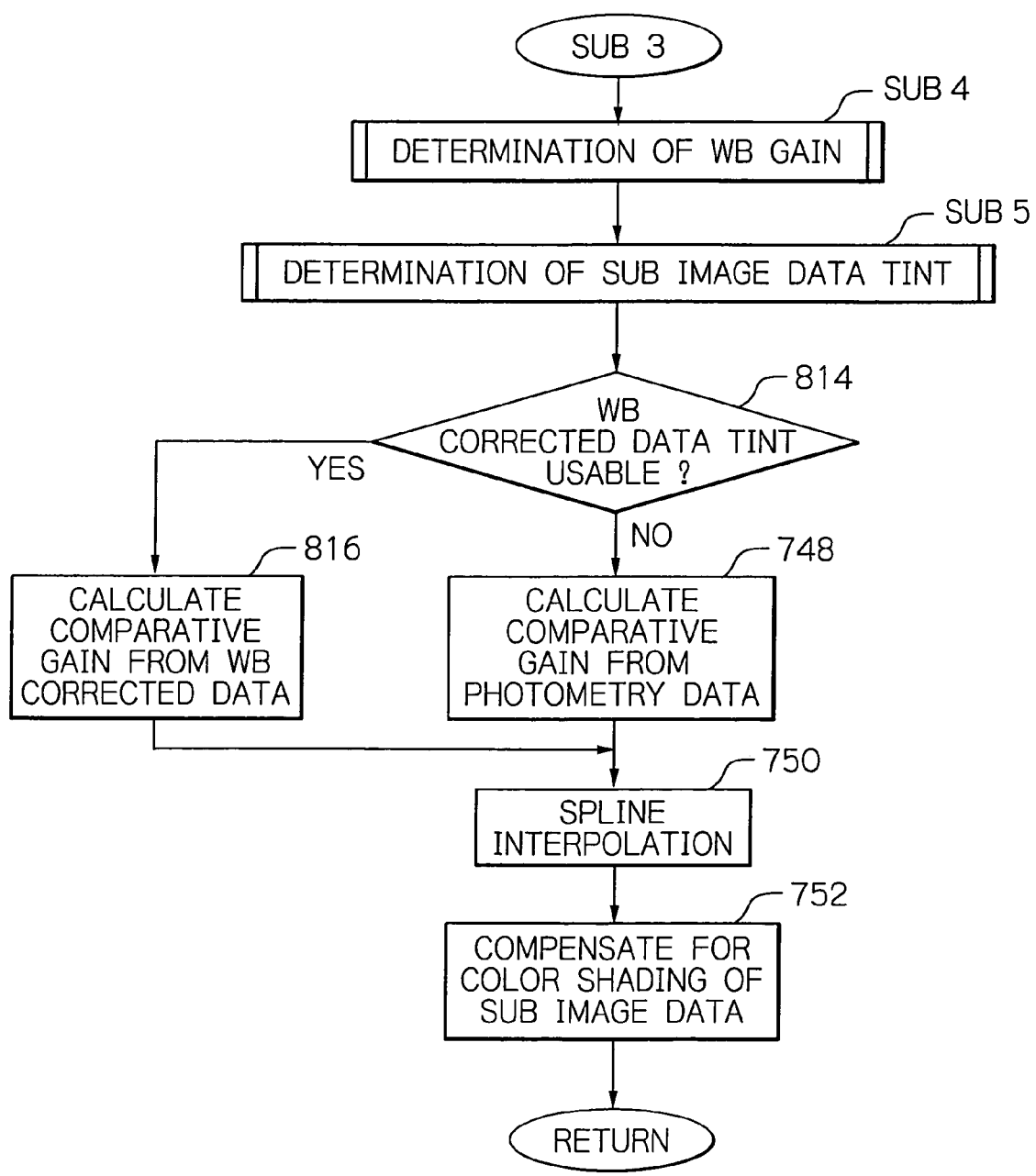
FIG. 12 is a flowchart showing a subroutine -included in the operation of FIG. 11 in detail.

Reference will be made to FIGS. 11 through 14 showing specific operational flows controlling the alternative embodiment. Steps 702, 704, 706, 708 and 710, and subroutine SUB1 shown in FIG. 11 are identical with the steps and subroutine shown in FIG. 8 and will not be described specifically in order to avoid redundancy. A subroutine SUB3 shown in FIG. 11 characterizes the specific operation of the alternative embodiment and will be described with reference to FIG. 12 in detail. As shown in FIG. 12, the subroutine SUB3 begins with a subroutine SUB4 for a determination of WB gain. The subroutine SUB4 shown in FIG. 12 will be described with reference to FIG. 13 in detail.

Figure 13:
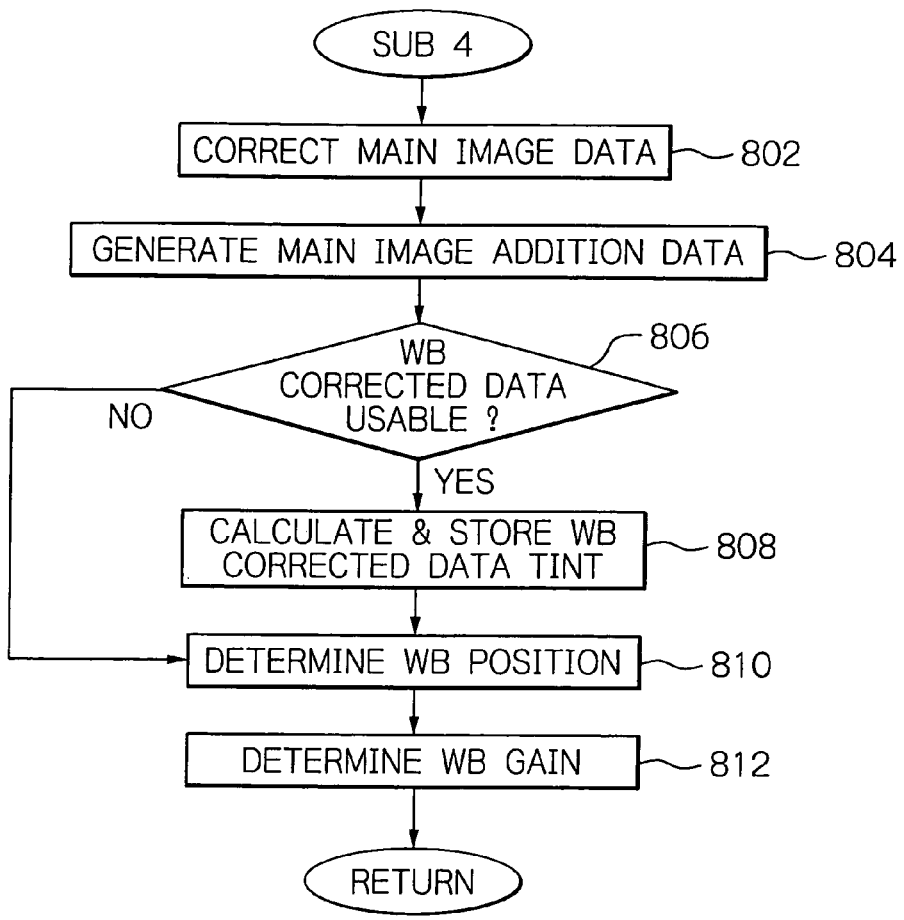
FIG. 13 is a flowchart showing a first subroutine included in the operation of FIG. 12 in detail.

As shown in FIG. 13, the subroutine SUB4 begins with a step 802 in which the main image data 202 are read out from the main image memory 52 and then processed by the offset corrector 56, LMTX corrector 60 and WB corrector 64 (step 802). The addition circuit 68 divides the WB corrected data fed from the WB corrector 64 into the plurality of blocks and adds image data block by block for thereby calculating R, G and B WB correction data G_WB(i,j), G_WB(i,j) and B_WB (i,j). The addition circuit 68 then compares each of the WB corrected data R_WB(i,j), G_WB(i,j) and B_WB(i,j) with the maximum charge level QLMAX (step 806).

If the WB corrected data R_WB(i,j), G_WB(i,j) and B_WB (i, j) all are smaller than the maximum charge level QLMAX, (YES, step 806), a step 808 will be executed. On the other hand, if at least one of the WB corrected data R_WB(i, j), G_WB(i,j) and B_WB(i,j) is greater than the maximum charge level QLMAX (NO, step 806), a step 810 will be executed.

In the step 808, tints R_WB(i,j)/G_WB(i,j) and B_WB(i, j)/G_WB(i,j) are calculated on the basis of the WB corrected data R_WB(i,j), G_WB(i,j) and B_WB(i,j) and then written into the RAM 70. In the step S810, a WB position is automatically determined on the basis of the WB corrected data R_WB(i,j) through B_WB(i,j) in accordance with, e.g. the color temperature of the scene captured. In a step 812 following the step 810, a WB gain is calculated from the WB corrected data R_WB(i,j) through B_WB(i,j) at the above WB position. This is the end of the subroutine SUB4.

Figure 14:
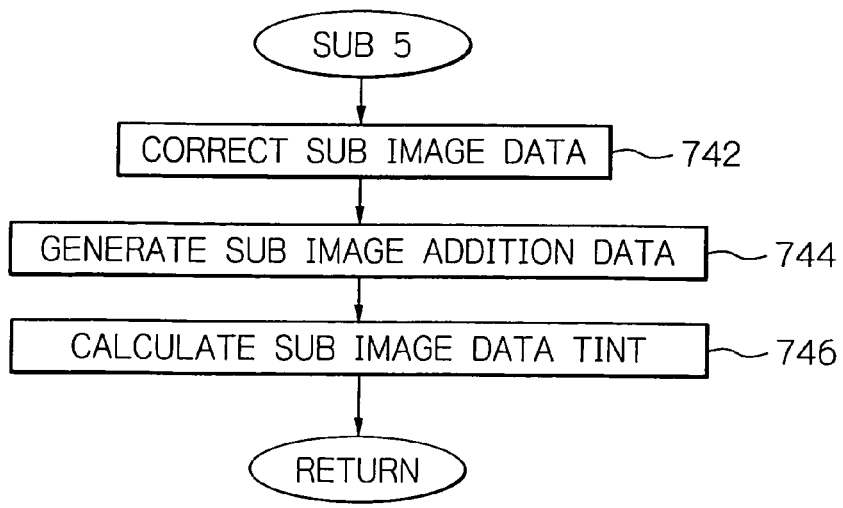
FIG. 14 is a flowchart showing a second subroutine included in the operation of FIG. 12 in detail.

As shown in FIG. 12, the subroutine SUB4 is followed by a subroutine SUB5 for a determination of subsidiary image data tints. The subroutine SUB5 shown in FIG. 12 will be described with reference to FIG. 14 in detail. As shown in FIG. 14, steps 742, 744 and 746 following the step 812 are identical with the steps 742, 744 and 746 of FIG. 8 in that the SHD corrector 72 calculates the subsidiary image data tints r(i,j)/g(i,j) and b(i,j)/g(i,j) from the subsidiary image data 204 stored in the subsidiary image memory 54. This is the end of the subroutine SUB4.

As shown in FIG. 12, the subroutine SUB5 is followed by a step 814. Particularly, in the alternative embodiment, the SHD corrector 72 determines whether or not the WB corrected data tints R_WB(i,j)/G_WB(i,j) and B_WB(i,j)/ G_WB(i,j) are stored in the RAM 70 (step 814). If the answer of the step 814 is YES, a step 816 is executed. Otherwise, a step 748 is executed. In the step 816, the SHD corrector 72 uses the expressions (15) and (16) to calculate comparative gains r_gain(i,j) and b_gain(i,j). On the other hand, in the step 748, the SHD corrector 72 uses the expressions (1) and (2) to calculate comparative gains r_gain(i,j) and b_gain(i,j) as in the step 748 of the previous embodiment, FIG. 8.

Steps 750 and 752 following the step 748 or 816 are identical with the steps 750 and 752 of FIG. 10 in that the SHD corrector 72 executes spline interpolation. More specifically, the SHD corrector 72 calculates shading correction gains r_gain_hokan(x,y) and b_gain_hokan(x,y) by using the expressions (5) and (6) and then executes shading correction on the subsidiary image data r(x,y) and b(x,y) corrected in the step 742 by using the above gains r_gain_hokan(x,y) and b_gain_hokan(x,y) and expressions (13) and (14). This is the end of the subroutine SUB3.

As shown in FIG. 11, the subroutine SUB3 described above is also followed by a step 710 identical with the step 710 of the previous embodiment, FIG. 8.

In summary, in accordance with the present invention, an image pickup apparatus determines an optimum exposure condition by divided photometry, generates shading correction gains in accordance with the photometry data tints block-by-block, and executes color shading correction on an image signal outputted by actual pickup in accordance with the shading correction gains. It is therefore possible to reduce a period of time necessary for generating shading correction data at a pickup adjustment stage. Also, in the optimum exposure condition thus determined, the color shading of subsidiary image data generated by actual pickup can be desirably corrected.

Further, in accordance with the present invention, main image data used to calculate a white balance gain include data corresponding to all pixels. By calculating color shading correction gains on the basis of the all pixel data tints, it is possible to generate color shading correction gains more accurately than by calculating them on the basis of pixel data reduced or thinned out.

The entire disclosure of Japanese patent application No. 2004-80190 filed on Mar. 19, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus comprising:
a solid-state image sensor comprising first photosensitive cells for photoelectrically converting incident light from a subject field and second photosensitive cells for photoelectrically converting the incident light with lower sensitivity than the first photosensitive cells, each of the first photosensitive cells forming a particular pixel together with a corresponding one of the second photosensitive cells; and
a signal processor for processing a first image signal and a second image signal outputted from the first photo sensitive cell and the second photosensitive cell, respectively;
said signal processor comprising an actual pickup circuit for processing an actual pickup signal representative of the subject field actually picked up, and a photometry circuit for processing a photometry signal representative of a quantity of the incident light to perform photometry before actual pickup;
said actual pickup circuit comprising a shading corrector for executing shading correction on the actual pickup signal;
said photometry circuit dividing an image represented by the photometry signal into a preselected number of blocks, measuring a quantity of the incident light block by block to thereby produce a result of photometry block by block, and generating first color shading correction information in accordance with a result of photometry;
said shading corrector comprising a color shading corrector for generating shading correction gains in accordance with the first color shading correction information and executing, based on the shading correction gains, color shading correction on the actual pickup signal.

2. The apparatus in accordance with claim 1, wherein said photometry circuit performs photometry on a basis of the photometry signal outputted from the first photosensitive cell,
said color shading corrector executing color shading correction on a second image signal comprising the actual pickup signal.

3. The apparatus in accordance with claim 2, wherein said photometry circuit determines an exposure condition in which photometry data, contained in the photometry signal and each corresponding to a particular block, do not exceed a preselected maximum saturation value of the first photosensitive cell, and generates the first color shading correction information in accordance with the photometry data satisfying the exposure condition.

4. The apparatus in accordance with claim 2, wherein said photometry circuit receives the photometry signal from the first photosensitive cells, which are reduced.

5. The apparatus in accordance with claim 3, wherein said photometry circuit receives the photometry signal which is reduced, from the first photosensitive cells.

6. The apparatus in accordance with claim 2, wherein said photometry circuit adds red pixel data, green pixel data and blue pixel data which are contained in the photometry signal derived from each block to generate red photometry data, green photometry data and blue photometry data for the block, respectively, and calculates, based on the red photometry data, the green photometry data and the blue photometry data, photometry signal tints for each block,
said color shading corrector dividing an image represented by the second image signal into the preselected number of blocks, adding red pixel data, green pixel data and blue pixel data which are contained in the second image signal derived from each block to generate red subsidiary image data, green subsidiary image data and blue subsidiary image data for the block, respectively, calculating second image signal tints on a basis of the red subsidiary image data, the green subsidiary image data and the blue subsidiary image data for each block, and generating the shading correction gains in accordance with first shading correction information comprising the photometry signal tints.

7. The apparatus in accordance with claim 3, wherein said photometry circuit adds red pixel data, green pixel data and blue pixel data which are contained in the photometry signal derived from each block to generate red photometry data, green photometry data and blue photometry data for the block, respectively, and calculates, based on the red photometry data, the green photometry data and the blue photometry data, photometry signal tints for each block,
said color shading corrector dividing an image represented by the second image signal into the preselected number of blocks, adding red pixel data, green pixel data and blue pixel data which are contained in the second image signal derived from each block to generate red subsidiary image data, green subsidiary image data and blue subsidiary image data for the block, respectively, calculating second image signal tints on a basis of the red subsidiary image data, the green subsidiary image data and the blue subsidiary image data for each block, and generating the shading correction gains in accordance with first shading correction information comprising the photometry signal tints.

8. The apparatus in accordance with claim 4, wherein said photometry circuit adds red pixel data, green pixel data and blue pixel data which are contained in the photometry signal derived from each block to generate red photometry data, green photometry data and blue photometry data for the block, respectively, and calculates, based on the red photometry data, the green photometry data and the blue photometry data, photometry signal tints for each block,
said color shading corrector dividing an image represented by the second image signal into the preselected number of blocks, adding red pixel data, green pixel data and blue pixel data which are contained in the second image signal derived from each block to generate red subsidiary image data, green subsidiary image data and blue subsidiary image data for the block, respectively, calculating second image signal tints on a basis of the red subsidiary image data, the green subsidiary image data and the blue subsidiary image data for each block, and generating the shading correction gains in accordance with first shading correction information comprising the photometry signal tints.

9. The apparatus in accordance with claim 6, wherein said signal processor further comprises an addition circuit for calculating second color shading correction information on a basis of a non-corrected signal, which is the first image signal not subjected to white balance correction,
said addition circuit dividing an image represented by the non-corrected signal into the preselected number of blocks, adding red pixel data, green pixel data and blue pixel data included in the non-corrected signal block by block to thereby generate non-corrected red data, non-corrected green data and non-corrected blue data, respectively, and using the non-corrected red data, the non-corrected green data and the non-corrected blue data to calculate non-corrected signal tints block by block,
said color shading corrector comparing the non-corrected red data, the non-corrected green data and the non-corrected blue data with a preselected maximum charge level and generating the shading correction gains based on the second image signal tints in accordance with, if the non-corrected red data, the non-corrected green data and the non-corrected blue data all exceed the preselected maximum charge level, the photometry signal tints or otherwise in accordance with the non-corrected signal tints.

10. The apparatus in accordance with claim 1, wherein said color shading corrector interpolates the shading correction gains for bidimensional smoothing.

11. The apparatus in accordance with claim 2, wherein said color shading corrector interpolates the shading correction gains for bidimensional smoothing.

12. The apparatus in accordance with claim 3, wherein said color shading corrector interpolates the shading correction gains for bidimensional smoothing.

13. The apparatus in accordance with claim 4, wherein said color shading corrector interpolates the shading correction gains for bidimensional smoothing.

14. The apparatus in accordance with claim 6, wherein said color shading corrector interpolates the shading correction gains for bidimensional smoothing.

15. The apparatus in accordance with claim 9, wherein said color shading corrector interpolates the shading correction gains for bidimensional smoothing.

16. The apparatus in accordance with claim 10, wherein said color shading corrector interpolates the shading correction gains by spline interpolation.

17. The apparatus in accordance with claim 1, wherein said shading corrector includes a luminance shading corrector for executing luminance shading correction on the actual pickup signal.

18. The apparatus in accordance with claim 2, wherein said shading corrector includes a luminance shading corrector for executing luminance shading correction on the actual pickup signal.

19. The apparatus in accordance with claim 3, wherein said shading corrector includes a luminance shading corrector for executing luminance shading correction on the actual pickup signal.

20. The apparatus in accordance with claim 4, wherein said shading corrector includes a luminance shading corrector for executing luminance shading correction on the actual pickup signal.

21. The apparatus in accordance with claim 6, wherein said shading corrector includes a luminance shading corrector for executing luminance shading correction on the actual pickup signal.

22. The apparatus in accordance with claim 9 wherein said shading corrector includes a luminance shading corrector for executing luminance shading correction on the actual pickup signal.

23. The apparatus in accordance with claim 10 wherein said shading corrector includes a luminance shading corrector for executing luminance shading correction on the actual pickup signal.

24. The apparatus in accordance with claim 16 wherein said shading corrector includes a luminance shading corrector for executing luminance shading correction on the actual pickup signal.

25. A method of correcting shading for a solid-state image pickup apparatus comprising first photosensitive cells for photoelectrically converting incident light from a subject field and second photosensitive cells for photoelectrically converting the incident light with lower sensitivity than the first photosensitive cells, each of the first photosensitive cells forming a particular pixel together with corresponding one of the second photosensitive cells, comprising:

a signal processing step of processing a first image signal and a second image signal outputted from the first photosensitive cell and the second photosensitive cell, respectively;

said signal processing step comprising an actual pickup substep of processing an actual pickup signal representative of the subject field actually picked up, and a photometry substep of processing a photometry signal representative of a quantity of the incident light to execute photometry before said actual pickup substep;

said actual pickup step comprising a broad dynamic range signal processing substep of combining the first signal with the second signal such that a sensitivity ratio between the first photosensitive cell and the second photosensitive cell is identical throughout all pixels, and a shading correcting substep of executing shading correction on the actual pickup signal;

said photometry substep dividing an image represented by the photometry signal into a preselected number of blocks, measuring a quantity of the incident light block by block to thereby produce a result of photometry block by block, and generating first color shading correction information in accordance with a result of photometry;

said shading correcting substep comprising a color shading correcting substep of generating shading correction gains in accordance with the first color shading correction information and executing, based on the shading correction gains, color shading correction on the actual pickup information.

26. The method in accordance with claim 25, wherein said photometry substep performs photometry on a basis of the photometry signal outputted from the first photosensitive cell, said color shading correcting substep executing color shading correction on a second image signal comprising the actual pickup signal.

27. The method in accordance with claim 26, wherein said photometry substep determines an exposure condition in which photometry data, contained in the photometry signal and each corresponding to a particular block, do not exceed a preselected maximum saturation value of the first photosensitive cell, and generates the first color shading correction information in accordance with the photometry data satisfying the exposure condition.

28. The method in accordance with claim 26, wherein said photometry substep receives the photometry signal, which is reduced from said the photosensitive cells.

29. The method in accordance with claim 27, wherein said photometry substep receives the photometry signal, which is reduced, from the first photosensitive cells.

30. The method in accordance with claim 26, wherein said photometry substep adds red pixel data, green pixel data and blue pixel data, which are contained in the photometry signal derived from each block, to generate red photometry data, green photometry data and blue photometry data for the block, respectively, and calculates, based on the red photometry data, the green photometry data and the blue photometry data, photometry signal tints for each block, said color shading correcting substep dividing an image represented by the second image signal into the preselected number of blocks, adding red pixel data, green pixel data and blue pixel data which are contained in the second image signal to generate red subsidiary image data, green subsidiary image data and blue subsidiary image data for each block, respectively, calculating second image signal tints on a basis of the red subsidiary image data, the green subsidiary image data and the blue subsidiary image data for each block, and generating the shading correction gains in accordance with first shading correction information comprising the photometry signal tints.

31. The method in accordance with claim 27, wherein said photometry substep adds red pixel data, green pixel data and blue pixel data, which are contained in the photometry signal derived from each block, to generate red photometry data, green photometry data and blue photometry data for the block, respectively, and calculates, based on the red photometry data, the green photometry data and the blue photometry data, photometry signal tints for each block, said color shading correcting substep dividing an image represented by the second image signal into the preselected number of blocks, adding red pixel data, green pixel data and blue pixel data which are contained in the second image signal to generate red subsidiary image data, green subsidiary image data and blue subsidiary image data for each block, respectively, calculating second image signal tints on a basis of the red subsidiary image data, the green subsidiary image data and the blue subsidiary image data for each block, and generating the shading correction gains in accordance with first shading correction information comprising the photometry signal tints.

32. The method in accordance with claim 28, wherein said photometry substep adds red pixel data, green pixel data and blue pixel data, which are contained in the photometry signal derived from each block, to generate red photometry data, green photometry data and blue photometry data for the block, respectively, and calculates, based on the red photometry data, the green photometry data and the blue photometry data, photometry signal tints for each block, said color shading correcting substep dividing an image represented by the second image signal into the preselected number of blocks, adding red pixel data, green pixel data and blue pixel data which are contained in the second image signal to generate red subsidiary image data, green subsidiary image data and blue subsidiary image data for each block, respectively, calculating second image signal tints on a basis of the red subsidiary image data, the green subsidiary image data and the blue subsidiary image data for each block, and generating the shading correction gains in accordance with first shading correction information comprising the photometry signal tints.

33. The method in accordance with claim 30, wherein said signal processing step further comprises an adding substep of calculating second color shading correction information on a basis of a non-corrected signal, which is the first image signal not subjected to white balance correction, said adding substep dividing an image represented by the non-corrected signal into the preselected number of blocks, adding red pixel data, green pixel data and blue pixel data included in the non-corrected signal block by block to thereby generate non-corrected red data, non-corrected green data and non-corrected blue data, respectively, and using the non-corrected red data, the non-corrected green data and the non-corrected blue data to calculate non-corrected signal tints block by block, said color shading correcting substep comparing the non-corrected red data, the non-corrected green data and the non-corrected blue data with a preselected maximum charge level, and generating the shading correction gains based on the second image signal tints in accordance with, if the non-corrected red data, the non-corrected green data and the non-corrected blue data all exceed the preselected maximum charge level, the photometry signal tints, or otherwise in accordance with the non-corrected signal tints.

34. The method in accordance with claim 25, wherein said color shading correcting substep interpolates the shading correction gains for bidimensional smoothing.

35. The method in accordance with claim 26, wherein said color shading correcting substep interpolates the shading correction gains for bidimensional smoothing.

36. The method in accordance with claim 27, wherein said color shading correcting substep interpolates the shading correction gains for bidimensional smoothing.

37. The method in accordance with claim 28, wherein said color shading correcting substep interpolates the shading correction gains for bidimensional smoothing.

38. The method in accordance with claim 30, wherein said color shading correcting substep interpolates the shading correction gains for bidimensional smoothing.

39. The method in accordance with claim 33, wherein said color shading correcting substep interpolates the shading correction gains for bidimensional smoothing.

40. The method in accordance with claim 34, wherein said color shading correcting substep interpolates the shading correction gains by spline interpolation.

41. The method in accordance with claim 25, wherein said shading correcting substep includes a luminance shading correcting substep of executing luminance shading correction of the actual pickup signal.

42. The method in accordance with claim 26, wherein said shading correcting substep includes a luminance shading correcting substep of executing luminance shading correction with the actual pickup signal.

43. The method in accordance with claim 27, wherein said shading correcting substep includes a luminance shading correcting substep of executing luminance shading correction with the actual pickup signal.

44. The method in accordance with claim 28, wherein said shading correcting substep includes a luminance shading correcting substep of executing luminance shading correction with the actual pickup signal.

45. The method in accordance with claim 30, wherein said shading correcting substep includes a luminance shading correcting substep of executing luminance shading correction with the actual pickup signal.

46. The method in accordance with claim 34, wherein said shading correcting substep includes a luminance shading correcting substep of executing luminance shading correction with the actual pickup signal.

47. The method in accordance with claim 35, wherein said shading correcting substep includes a luminance shading correcting substep of executing luminance shading correction with the actual pickup signal.

48. The method in accordance with claim 40, wherein said shading correcting substep includes a luminance shading correcting substep of executing luminance shading correction with the actual pickup signal.

* * * * *